United States Patent [19]

Ogawa et al.

[11] Patent Number: 4,931,344
[45] Date of Patent: Jun. 5, 1990

[54] FASTENER COMPONENT

[75] Inventors: Kunihiko Ogawa, Tsurugashimamachi; Yoshio Noguchi, Sakado, both of Japan

[73] Assignee: Kuraray Company, Ltd., Kurashiki, Japan

[21] Appl. No.: 284,682

[22] Filed: Dec. 15, 1988

Related U.S. Application Data

[63] Continuation-in-part of Ser. No. 140,112, Dec. 30, 1987, Pat. No. 4,842,916.

[30] Foreign Application Priority Data

Dec. 15, 1987 [JP] Japan .............................. 62-191246[U]

[51] Int. Cl.$^5$ .............................................. A44B 21/00
[52] U.S. Cl. ..................................... 428/100; 428/120; 428/172; 428/192; 428/195; 24/444
[58] Field of Search ............... 428/100, 120, 156, 172, 428/195, 192; 24/444

[56] References Cited

U.S. PATENT DOCUMENTS

| | | | |
|---|---|---|---|
| 4,693,921 | 9/1987 | Billarant et al. | 428/100 |
| 4,710,414 | 12/1987 | Northrup et al. | 428/100 |
| 4,784,890 | 11/1988 | Black | 428/100 |
| 4,842,916 | 6/1989 | Ogawa et al. | 428/100 |

Primary Examiner—Alexander S. Thomas
Attorney, Agent, or Firm—Oblon, Spivak, McClelland, Maier & Neustadt

[57] ABSTRACT

A fastener component is provided with hook-like interlocking elements on the front side of a substrate sheet and an anchor member on the back side. The fastener component is provided with at least one flat portion void of the interlocking elements on the front side to make the fastener component flexible or pliable to fit a curved or bent portion of a molded cushion body or other molded structures on which the fastener component is to be anchored. The fastening element-free flat portions may be provided along the longitudinal side edges of the fastener component for mounting thereon magnetic metal strips which are attracted by magnets embedded in a mold to fix the fastener component in position in the mold during a molding process.

16 Claims, 2 Drawing Sheets

FASTENER COMPONENT

BACKGROUND OF THE INVENTION

1. Field of the Invention

The present application is a continuation in part of U.S. patent application Ser. No. 07/140,112, filed on Dec. 31, 1987 now U.S. Pat. No. 4,842,916.

This invention relates to a fastener component of the so-called hook and loop fastener type, which can be easily joined integrally to a curved or bent portion of a molded cushion body or other molded structures of various kinds.

DISCUSSION OF THE RELATED ART

Hook and loop fasteners are widely used as means for joining textile fabrics or other diverse articles. As an example, it has been known to attach one component of the fastener to a predetermined position on the surface of a cushion body and to fix a cover or skin material on the cushion body by engaging the fastener component with the other component of the hook and loop fastener which is attached to the rear side of the cover material. For attaching a fastener component on the surface of a cushion body, there have been known in the art a number of methods, including:

(i) a method of manufacturing a seat cushion comprising forming a fastener component by attaching a sheet of non-woven fabric or the like to the back side of a fastener strip having hook-like interlocking elements, fixing the same within a mold using an adhesive, and introducing and foaming a molding material in the mold (Japanese Utility Model Application Laid-Open No. 59-184599); and (ii) a method of forming a molded article comprising covering hook-like interlocking elements of a fastener component entirely with a film, mounting a metal sheet in the fastener component, fixing the fastener component by attracting it by a magnet which is provided in the mold, and introducing and foaming a molding material in the mold to fix the fastener component integrally on the molded article (U.S. Pat. No. 4,693,921).

Of the conventional methods for fixing hook and loop fastener components on molded cushion bodies, the method (i) which uses an adhesive has problems in that the fixation of the fastener component in the mold is troublesome and the adjustment of its mounting position is difficult. On the other hand, the fastener component employed in the method (ii) has the hook-like interlocking elements arranged over the entire surface of the substrate sheet of the fastener, and the metal sheet is laid longitudinally in a middle portion of the fastener, so that it is difficult to bend the fastener component in the longitudinal direction or into an arcuate shape. Therefore, in a case where the fastener component is molded to a bent or curved portion of a molding, it is likely that wrinkles and slack occur on the outer side of the cover material when fixed on the curved or bent portion of the molded body by engaging the fastener component on the molded body with a mating fastener component which is opposingly attached to the rear side of the cover material.

SUMMARY OF THE INVENTION

It is therefore an object of the present invention to provide a fastener component which can be easily and securely fixed in a mold without the trouble of fixing the same in a mold by the use of an adhesive, and which can be bent or flexed freely in the longitudinal direction and integrally joined to a bent or curved portion of a molded body in a facilitated manner.

In accordance with the present invention, for solving the above-mentioned problems, there is provided a fastener component which is formed of a substrate member having a multitude of hook-like interlocking elements on one side thereof and anchoring means on the opposite side, the fastener component being provided with at least one elongate flat portion void of the hook-like interlocking elements on the side of the substrate member which bears the hook-like interlocking elements.

As one embodiment of the present invention, the fastener component comprises a substrate member composed of a substrate sheet having a multitude of hook-like interlocking elements (hereinafter referred to simply as "interlocking elements" for brevity) and a separate anchor member which is bound integrally to the substrate sheet by the use of an adhesive or by an ultrasonic welding process or other suitable means and has anchor means thereon. This substrate sheet with interlocking elements may be a so-called tape fastener or magic tape which is formed by weaving or knitting a filament fiber. Alternatively, the substrate sheet may be composed of an extruded plastic sheet with a multitude of interlocking elements on its front side.

According to another embodiment of the invention, the interlocking elements and the anchor means are formed respectively on different surfaces of the substrate member in the form of the substrate sheet. In a particular example, a multitude of interlocking elements and anchor means are provided on opposite sides of a single substrate sheet, respectively. In this case, the interlocking elements are in the form of hooks, and the anchor means consists of a large number of loops of monofilament. In another particular example, the fastener component is composed of an extruded plastic substrate sheet having a multitude of interlocking elements on one side and a large number of anchor means on the opposite side thereof. In this instance, the interlocking elements and anchor means can be formed in various shapes by extrusion molding, for example, in the shape of arrow heads, mushrooms and the like. The fastener component which has the substrate sheet formed integrally with the anchor means can be made thinner and more flexible to ensure better bonding to synthetic resin moldings as well as higher compatibility to curved surfaces of molded bodies as compared with the fastener component which has anchor and substrate members joined together.

The conventional fastener component which has the hook-like interlocking elements over its entire surface is stiff and difficult to bend, especially in the longitudinal direction. However, it was not possible to provide a flat portion on a fastener component with interlocking elements over the entire area of its face by ultrasonically melting part of the interlocking elements. This melting method resulted in a flat portion having small holes due to overheating of the interlocking element portions by the ultrasonic waves. In addition, the polymer material of the interlocking elements melted and integrated into the substrate, thereby increasing the thickness of the flat portion and making it difficult to retain flexibility at that portion. Consequently, the present invention has been achieved based in part on the recognition that it is important to initially provide an interlocking element-free flat portion on the fastener component. At least one elongate flat portion as above mentioned is provided on the side of the fastener having the interlocking elements. It is preferred to provide more than two of such flat portions where the fastener component is to be bent through a large angle or in a case where the fastener component has a large width.

The provision of such a flat portion also makes it possible to join a substrate sheet having the interlocking elements with an anchor member by ultrasonic welding. This is effective to reduce the thickness of the flat portion and to impart higher flexibility thereto. If desired, the thickness of the flat portion may be minimized by other methods. In addition to the flat portion which is provided centrally on the interlocking element-bearing side of the fastener component, an elongate flat portion may be provided to run longitudinally along each side edges of the fastener component. The elongate flat portions which are formed along the opposite longitudinal side edges of the fastener component are used for mounting magnetic metal strips which will be described hereinlater. Besides the elongate flat portions, a transverse flat portion or portions may be provided, if desired, for improving the bidirectional flexibility of the fastener component.

The hook-shaped interlocking elements to be used in the present invention may be in the form of hooks, mushrooms, umbrellas or any other shape as long as they have interlocking functions.

Examples of the anchor means which serves to securely join the fastener component with a synthetic resin molding including knitted or woven fabrics, nonwoven fabrics, a large number of projections or protrusions and a member having large number of projections or protrusions, which permits penetration of impregnation of a liquid synthetic resin material to be molded. Examples of the projections or protrusions include monofilament loops, multifilament loops, projections of mushroom or umbrella shapes and the like.

The aforementioned magnetic metal strips are mounted on the interlocking element-carrying side of the fastener component according to the present invention, and the interlocking elements and magnetic metal strips are covered with a thin plastic film before placing the fastener component in the mold for the synthetic resin molding. The magnetic metal strip is positioned centrally on the interlocking element-bearing side of the fastener component or along the aforementioned longitudinal side edges.

The plastic film prevents the interlocking elements from being buried under the liquid synthetic resin material which is introduced into the mold, and therefore it may be called a "protective film".

The materials useful as the protective film which entirely covers the interlocking elements include polyester, Nylon, polypropyrene, polyethylene, a ethylene-vinyl acetate copolymer and the like. The film is attached to the side edge portions of the fastener component by the use of a hot melt adhesive, a dual adhesive tape, ultrasonic waves or other suitable means.

As means for fixing the fastener component suitably in the mold, a magnet is embedded at a predetermined position in the mold cavity wall to utilize its magnetic attractive force, thereby the magnetic metal strip on the fastener component is fixed in the predetermined position within the mold, and the above-mentioned problems of the prior art are eliminated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
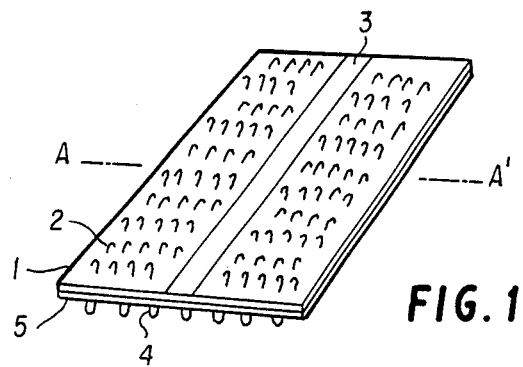
FIG. 1 is a schematic perspective view of a fastener component embodying the present invention.
Figure 2:
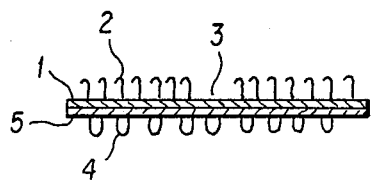
FIG. 2 is a cross-sectional view taken on line A-A' of FIG. 1.

Referring to the drawings and first to FIG. 1, there is shown an embodiment of a fastener component according to the present invention, having a multitude of hook-like interlocking elements 2 on the front side of substrate sheet 1 of a hook and loop type fastener, and centrally provided with a flat portion 3 which is free of the interlocking elements. An anchor member 5 with anchor means in the form of a large number of monofilament loops 4 is integrally bonded to the back side of the substrate sheet 1. The substrate sheet and anchor member together form a substrate member. FIG. 2 shows the fastener component in a cross-sectional view taken on line A-A' of FIG. 1.

Figure 3:
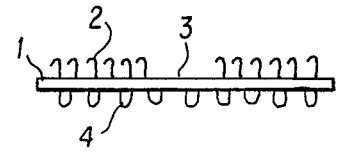
FIG. 3 is a schematic cross-sectional view similar to FIG. 2, but of another embodiment of the invention.

Illustrated in section in FIG. 3 is a fastener component similar to the one shown in FIG. 1 but having the hook-like interlocking elements 2 and a large number of monofilament loops 4 on the opposite sides of a substrate member in the form of a single substrate sheet 1, which may be an extruded plastic sheet.

Figure 4:
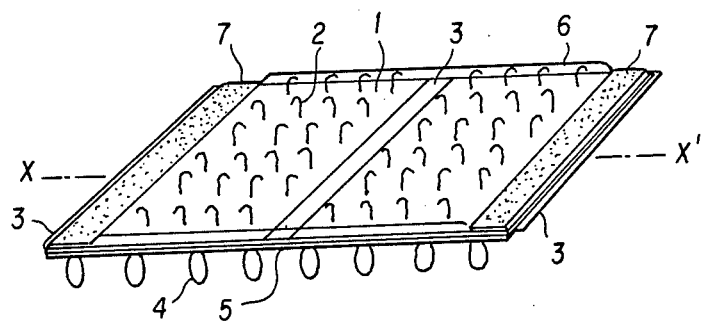
FIG. 4 is a schematic perspective view of another embodiment of the invention.
Figure 5:
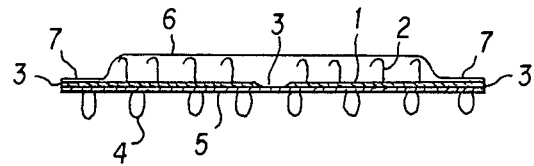
FIG. 5 is a cross-sectional view taken on line X-X' of FIG. 4.

Referring to FIG. 4, there is shown in perspective view another embodiment of the invention, which is provided with a large number of hook-like interlocking elements 2 on the front side of substrate sheet 1 and interlocking element-free flat portions 3 formed along the longitudinal side edges of the substrate sheet 1 in addition to a center flat portion 3. An anchor member 5 with a multitude of monofilament loops 4 as anchor means is integrally adhered to the back side of the substrate sheet 1. The front side of the fastener component is covered with a protective film 6, and magnetic metal strips 7 are mounted on the side flat portions 3. The center flat portion 3 is slightly depressed into a concave shape after welding the fastener substrate sheet 1 and anchor member 5 together along the center flat portion 3 by an ultrasonic welding process. FIG. 5 shows this fastener component in a cross-sectional view taken along line X-X' of FIG. 4.

Figure 6:
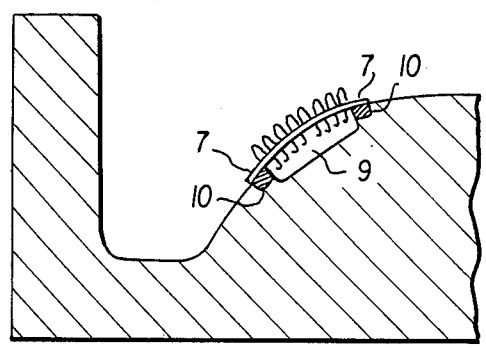
FIG. 6 is a cross-sectional view of a fastener component placed in position in a mold.
Figure 7:
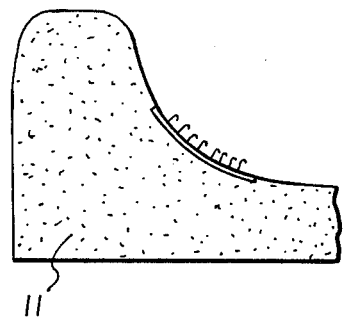
FIG. 7 is a cross-sectional view of a molded body with a molded-in fastener component.

Illustrated in a cross-sectional view in FIG. 6 is a fastener component according to the invention, which has a multitude of the hook-shaped interlocking elements 2 on one side thereof and which is fixed in a mold 8 so as to face the anchor means toward the bottom surface of a groove 9 of a curved shape, by attracting the metal strips 7 to magnets 10 embedded in the mold. FIG. 7 shows in a cross-section a resulting fastener component which is integrally anchored to a molded body 11.

It will be appreciated from the foregoing description that, according to the present invention, at least one flat portion void of interlocking elements is provided in the longitudinal direction of a fastener component preferably in combination with a magnetic metal strip, thereby making the fastener component easily pliable along a curved or bent portion of a molded cushion body or other molded articles as it is integrally molded thereto, thereby permitting broadened variations in the design of the moldings.

Although the invention has been described and shown by way of some preferred embodiments, it is to be understood that the invention is not restricted to the particular forms shown and various modifications and alterations can be made thereto without departing from the technical scope of the invention as defined in the appended claims.

What is claimed as new and desired to be secured by Letters Patent of the United States is:

1. A fastener component comprising:
   (a) a substrate member having a multitude of hook-shaped fastening elements on one side thereof and anchoring means on the other side thereof; and
   (b) at least one elongate flat portion of said one side of said substrate member which is void of said hook-shaped fastening elements,
   (c) wherein said at least one elongate portion comprises a single longitudinal flat portion provided substantially at the center of said one side of said substrate member.

2. A fastener component as defined in claim 1, wherein said substrate member is formed by a substrate sheet defining said one side and having said multitude of hook-shaped fastening elements, and an anchor member defining said other side and having said anchoring means, said anchor member being integrally fixed to said substrate sheet.

3. A fastener component as defined in claim 2, wherein said hook-shaped elements are made of a monofilament.

4. A fastener component as defined in claim 1, wherein said anchor means is selected from the group consisting of a knitted fabric, a woven fabric, nonwoven fabric, a multitude of projections and an anchor member having a multitude of projections.

5. A fastener component as defined in claim 4 having said anchoring member embedded in a curved surface of a molded resin body.

6. A fastener component as defined in claim 1, wherein said substrate member comprises a single substrate sheet provided with hook-shaped fastening elements and said anchor means on opposite sides thereof.

7. A fastener component as defined in claim 6, wherein said substrate sheet has a monofilament knitted or woven therein as said anchor means.

8. A fastener component as defined in claim 6, wherein said substrate sheet is plastic.

9. A fastener component as defined in claim 1, including additional flat portions provided along opposite longitudinal side edges of said substrate member and magnetic metal strips mounted to said flat portions provided along said side edges.

10. A fastener component as defined in claim 9, including a protective film carrying said fastening elements.

11. A fastener component as defined in claim 9, wherein said at least one elongate flat portion is in the form of a groove void of said fastening elements and having a smaller thickness than a remainder of said substrate member.

12. A fastener component as defined in claim 1 having said anchoring member embedded in a curved surface of a molded resin body.

13. A fastener component comprising:
   (a) a substrate member having a multitude of hook-shaped fastening elements on one side thereof and anchoring means on the other side thereof; and
   (b) at least one elongate flat portion of said one side of said substrate member which is void of said hook-shaped fastening elements,
   (c) wherein said at least one elongate flat portion is in the form of a groove void of said fastening elements and having a smaller thickness than a remainder of said substrate member.

14. A fastener component comprising:
   (a) a substrate member having a multitude of hook-shaped fastening elements on one side thereof and anchoring means on the other side thereof; and
   (b) at least one elongate flat portion of said one side of said substrate member which is void of said hook-shaped fastening elements,
   wherein:
   (c) said hook-shaped elements are made of a monofilament; and
   (d) said at least one elongate flat portion comprises a single longitudinal flat portion provided substantially at the center of said one side of said substrate member.

15. A fastener component as defined in claim 14, including additional flat portions provided along opposite longitudinal side edges of said substrate member and magnetic metal strips mounted to said flat portions provided along said side edges.

16. A fastener component as defined in claim 15, wherein said at least one elongate flat portion is in the form of a groove void of said fastening elements and having a smaller thickness than the remainder of said substrate member.

* * * * *